(12) United States Patent
Kang et al.

(10) Patent No.: US 7,392,663 B2
(45) Date of Patent: Jul. 1, 2008

(54) TWO LAYER TYPE AIR CONDITIONER OF VEHICLES

(75) Inventors: Sung-Ho Kang, Seoul (KR); Yong-Eun Seo, Seoul (KR)

(73) Assignee: Halla Climate Control Corp., Daejeon-si (KR)

( * ) Notice: Subject to any disclaimer, the term of this patent is extended or adjusted under 35 U.S.C. 154(b) by 246 days.

(21) Appl. No.: 11/312,647

(22) Filed: Dec. 21, 2005

(65) Prior Publication Data

US 2006/0242984 A1 Nov. 2, 2006

(30) Foreign Application Priority Data

Dec. 21, 2004 (KR) ............... 10-2004-0109790

(51) Int. Cl.
*F25D 21/14* (2006.01)
(52) U.S. Cl. ............... 62/285; 62/291; 454/121; 454/126
(58) Field of Classification Search ............... 62/285, 62/288, 289, 291, 150, 272, 304, 244; 454/121, 454/126, 157
See application file for complete search history.

(56) References Cited

U.S. PATENT DOCUMENTS

| | | | | |
|---|---|---|---|---|
| 1,950,344 A | * | 3/1934 | Williams | 62/176.4 |
| 4,702,087 A | * | 10/1987 | Nakajima et al. | 62/285 |
| 4,843,835 A | * | 7/1989 | Goetz et al. | 62/285 |
| 4,882,911 A | * | 11/1989 | Immel | 62/288 |
| 4,893,481 A | * | 1/1990 | Sullivan | 62/291 |
| 4,916,919 A | * | 4/1990 | Kim, II | 62/272 |
| 4,974,421 A | * | 12/1990 | Kim, II | 62/272 |
| 5,787,721 A | * | 8/1998 | Fromm et al. | 62/285 |
| 6,196,015 B1 | * | 3/2001 | Pignolo | 62/285 |
| 6,343,480 B1 | * | 2/2002 | Correa et al. | 62/288 |
| 6,895,770 B1 | * | 5/2005 | Kaminski | 62/285 |

FOREIGN PATENT DOCUMENTS

| | | |
|---|---|---|
| FR | 2761013 | 9/1998 |
| GB | 2279143 | 12/1994 |
| JP | 1999-170841 | 6/1999 |
| JP | 11170841 | 6/1999 |
| JP | 2000-46367 A * | 2/2000 |

* cited by examiner

Primary Examiner—Mohammad M Ali
(74) Attorney, Agent, or Firm—Lowe Hauptman Ham & Berner LLP

(57) ABSTRACT

A two layer type air conditioner for vehicles facilitates drainage of water induced into a blower through an outside air intake to a condensed water outlet and prevents backflow of water to the blower. A blower has an intake duct for inhaling inside air and outside air. A double suction type scroll case mounted on the intake duct is divided into two passages by a partition plate. A blower fan is rotatably mounted in the two passages. A motor turns the blower fan. A case for the air conditioner includes an evaporator for cooling the air blown from the blower and a condensed water outlet for draining condensed water generated from the evaporator. The case is divided into two passages corresponding to those of the scroll case. A drain drains water induced into the blower to the condensed water outlet.

8 Claims, 5 Drawing Sheets

TWO LAYER TYPE AIR CONDITIONER OF VEHICLES

RELATED APPLICATION

The present application is based on, and claims priority from, KR Application Number 10-2004-0109790, filed Dec. 21, 2004, the disclosure of which is hereby incorporated by reference herein in its entirety.

BACKGROUND OF THE INVENTION

1. Field of the Invention

The present invention relates to a two layer type air conditioner of a vehicle, and more particularly, to a two layer type air conditioner of a vehicle, which can easily drain water, such as rainwater, induced into a blower through an outside air intake to a condensed water outlet formed for draining condensed water generated from an evaporator to the outside, and can prevent backflow of water to a blower.

2. Background Art

In general, an air conditioner of an automotive vehicle incurs a great loss of fuel due to a heavy load of a compressor if only the outside air is discharged to the inside of the vehicle through an outside air intake of a blower when the air conditioner is operated. Moreover, the air conditioner causes a passenger's inconvenience due to pollution of the inside air of the vehicle if only the inside air is circulated through the inside air intake of the blower. Particularly, the air conditioner increases the passenger's inconvenience since it cannot rapidly heat the vehicle and cannot defrost windows of the vehicle at the same time when the air conditioner is operated in a heating mode by an outside air intake mode in winter.

Considering the above points, for instance, Japanese Patent Publication No. 1999-170841 discloses a two layer inside air and outside air flow air conditioner. In the two layer inside air and outside air flow air conditioner, the inside air of the vehicle previously heated in the heating mode is induced through an inside air intake of a blower and heated in a heater core, and then, discharged to the inside of the vehicle through a floor vent. After that, the outside air of a low humidity is induced through the outside air intake of the blower and heated, and then, discharged to the inside of the vehicle through a defrost vent.

As shown in FIG. 1, the two layer type air conditioner includes: the blower 10 for controlling the airflow of the air discharged to the inside of the vehicle by inhaling the inside air and outside air according to the air intake mode; and an air conditioning case 60 housing an evaporator 80 embedded therein for cooling the air blown from the blower 10 and a number of vents (not shown) mounted on an outlet for controlling the air flow of the air discharged to the inside of the vehicle. The air conditioning case 60 may further include a heater core (not shown) embedded therein for heating the air.

In more detail, the blower 10 includes: an intake duct 20 having at least one inside/outside air intake (in the drawing, one outside air intake 26 and two inside air intakes 22 and 24 are formed) and at least one door for controlling opening and closing of the inside/outside air intake (in the drawing, two doors 28 and 30 are formed); a double suction type scroll case 40 embedded in the intake duct 20 and divided into a first flow channel 44 and a second flow channel 46 by a partition plate 42; a blower fan 48 rotatably extending from the first flow channel 44 to the second flow channel 46; and a motor 50 for rotating the blower fan 48.

Furthermore, also the air conditioning case 60 is divided into two passages 66 and 68 by a partition plate 62 in correspondence with the first and second passages 44 and 46. A condensed water outlet 64 for draining condensed water generated from the evaporator 80 to the outside is formed on the bottom of the air conditioning case 60 corresponding to evaporator. Furthermore, an insulator 70 serving as a cushioning material, seal material or insulating material is mounted between the air conditioning case 60 and the evaporator 80. The insulator 70 has a drain hole 72 for inducing the condensed water generated from the evaporator 80 to the condensed water outlet 64.

However, water is flown into the blower 10 from the outside air intake 26 due to various environments, for instance, when the vehicle travels on a waterway, travels in the rain, or is washed. When water is induced into the blower 10, the blower 10 cannot be operated due to a damage of the motor 50. Therefore, a technology to discharge water induced into the blower 10 to the condensed water outlet 64 has been disclosed.

That is, as shown in FIG. 1, when a drain pipe 90 is connected from the bottom of the intake duct 20 to the upper portion of the insulator 70 mounted on the air conditioning case 60, water induced into the intake duct 20 through the outside air intake 26 is induced to the upper portion of the insulator 70, so that the water can be drained to the outside through the drain hole 64 of the insulator 70 and the condensed water outlet 64.

However, the conventional two layer type air conditioner has several problems in that water and condensed water may flow backward to the blower 10 since static pressure directing to the evaporator 80 is higher than that directing to the bottom of the intake duct 20, and in that the flow channel for naturally draining water to the outside may be stopped due to its small area. Additionally, the blower 10 may be sealed in order to prevent backflow of water or condensed water to the blower 10. At this time, to improve sealing efficiency, a sealing rib (not shown) protrudes to the side surface of the air conditioning case 60, and a number of screws are used for enhancing its assembling performance, thereby the manufacturing costs of the conventional two layer type air conditioner is increased. Furthermore, in case where water induced into the blower 10 is drained to the drain hole, the number of components of the air conditioner is increased, and the system package of the air conditioner is increased in volume.

SUMMARY OF THE INVENTION

Accordingly, to solve the above disadvantages of the prior arts, it is an object of the present invention to provide a two layer type air conditioner of a vehicle, which can easily discharge water, such as rainwater, induced into a blower through an outside air intake to a condensed water outlet formed for discharging condensed water generated from an evaporator to the outside, and can prevent backflow of water to a blower.

To accomplish the above objects, according to the present invention, there is provided a two layer type air conditioner of a vehicle comprising: a blower having an intake duct for inhaling the inside air and outside air, a double suction type scroll case mounted on the intake duct and divided into two passages by a partition plate, a blower fan rotatably mounted in the two passages, and a motor for rotating the blower fan; an air conditioning case housing an evaporator therein for cooling the air blown from the blower and a condensed water outlet for draining condensed water generated from the evaporator, the air conditioning case being divided into two passages corresponding to the scroll case; and drain means for draining water induced into the blower to the condensed water outlet, wherein the drain means includes: a drain pipe for communicating the lower end of the intake duct with the lower end of the air conditioning case; and a drain passage for communicating the drain pipe with the condensed water outlet, the drain passage having an outlet located lower to a predetermined height than a drainage space formed beneath the evaporator at the lower end of the air conditioning case.

The drain passage is formed by a space surrounded by a pair of ribs mounted on the bottom of the air conditioning case, the bottom of the air conditioning case, and an insulator mounted beneath the evaporator.

The drain passage is formed by a space surrounded by a recess formed on the bottom of the air conditioning case, and an insulator mounted beneath the evaporator.

The drain passage is formed by a drain guide pipe formed integrally with the lower surface of the air conditioning case.

The drain passage directly communicates the drain pipe and the condensed water outlet with each other in a state where it is isolated from the passages of the air conditioning case in which the air flows.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Figure 1:
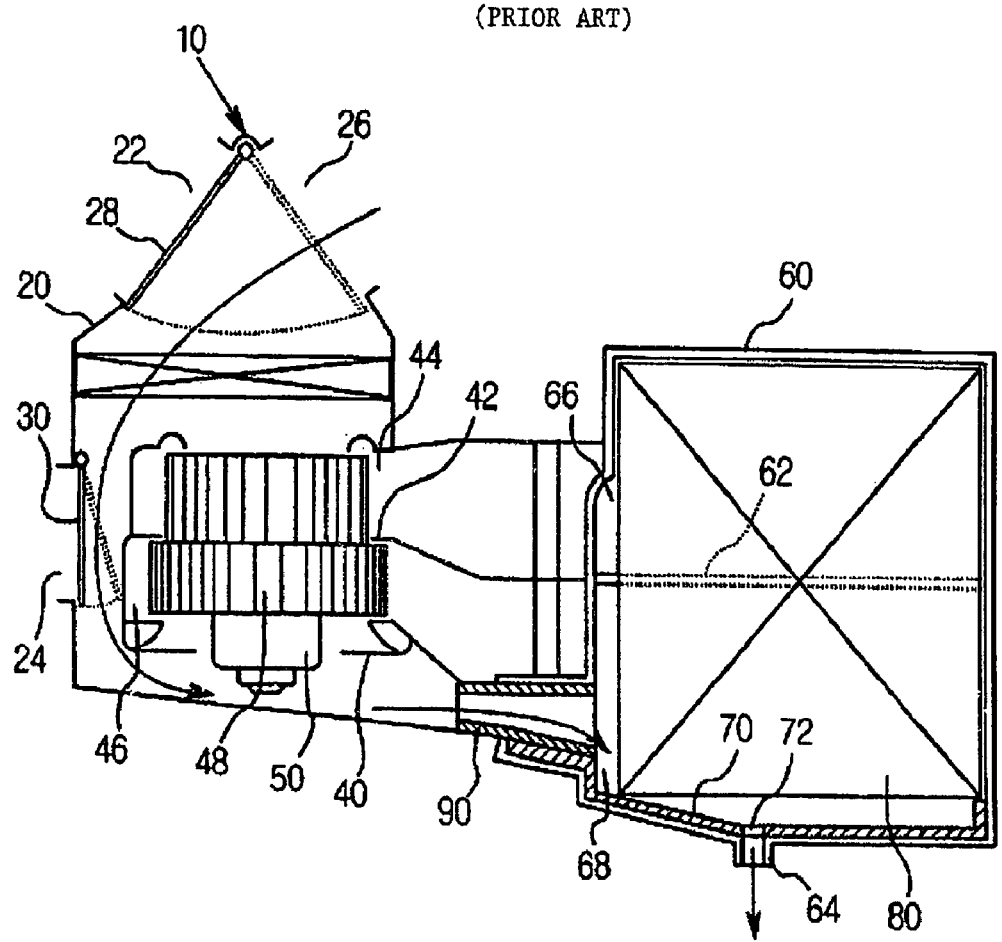
FIG. 1 is a sectional view of a conventional two layer type air conditioner.
Figure 2:
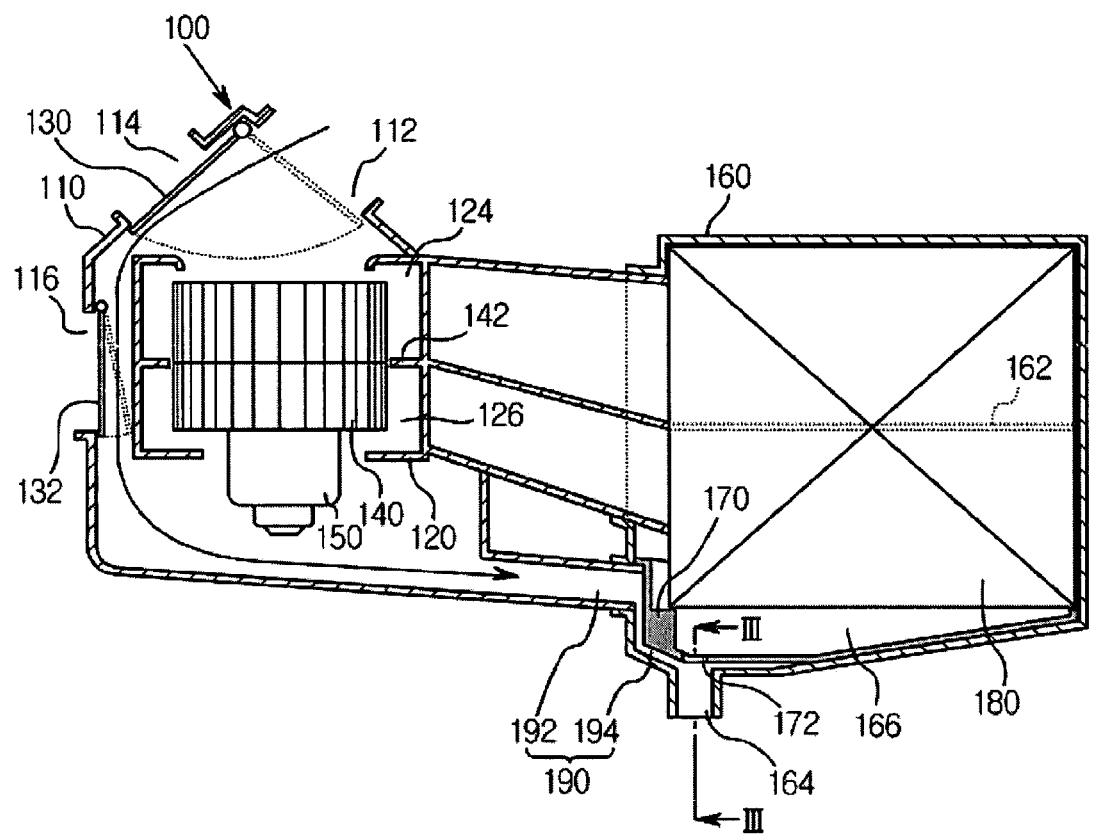
FIG. 2 is a sectional view of a two layer type air conditioner according to a first preferred embodiment of the present invention.

FIG. 2 is an illustration of a two layer type automotive air conditioner according to a first preferred embodiment of the present invention.

The two layer type air conditioner illustrated in FIG. 2 includes a blower 100, an air conditioning case 160 connected with the blower 100, an evaporator 180 embedded in the air conditioning case 160, and drain means 190 for draining water induced into the blower 100 toward the air conditioning case 160.

Furthermore, the blower 100 includes an intake duct 110 for sucking the inside air and outside air, a double suction type scroll case 120 mounted on the intake duct 110 and divided into two passages 124 and 126 by a partition plate 122, a blower fan 140 rotatably mounted in the two passages 124 and 126, and a motor 150 for rotating the blower fan 140.

The intake duct 110 includes at least one inside/outside air intake. In the drawing, the intake duct 110 includes one outside air intake 112 and first and second inside air intakes 114 and 116. Moreover, a first door 130 controls opening and closing of the outside air intake 112 and the first inside air intake 114, and a second door 132 controls opening and closing of the second inside air intake 116.

The air conditioning case 160 is divided into two passages by a partition plate 162 in correspondence to the two passages 124 and 126 of the scroll case 120, and the evaporator 180 embedded in the air conditioning case 160 serves to cool the air blown from the blower 100.

Additionally, not shown in the drawing, but a heater core for heating the air may be further embedded in the air conditioning case 160. In this case, a temperature controlling door for controlling opening and closing of a cold air path and a hot air path is mounted, and a number of vents (a defrost vent, a face vent and a flower vent) for controlling the direction of the wind toward the inside of a vehicle are mounted.

During an air cooling process by the evaporator 180, moisture contained in the air is coagulated on the surface of the evaporator 180, and thereby, condensed water is generated. To drain the condensed water to the outside, the air conditioning case 160 includes a condensed water outlet 164 formed in the bottom thereof corresponding to the evaporator 180.

Moreover, an insulator 170 may be interposed between the evaporator 180 and the bottom of the air conditioning case 160. The insulator 170 serves as an insulating material, a buffering material or a sealing material for preventing an influence of the outside air on the evaporator 180. In addition, the insulator 170 has a drain hole 172 for inducing the condensed water to the condensed water outlet 164. A space formed between the evaporator 180 and the insulator 170 serves as a drainage space 166 for inducing the condensed water generated from the evaporator 180 to the condensed water outlet 164. That is, when the condensed water flows from the evaporator 180 to the drainage space 166, the condensed water can be drained to the condensed water outlet 164 through the drain hole 172 formed on the insulator 170.

Meanwhile, according to the present invention, the drain means 190 extending from the blower 100 to the condensed water outlet 164 serves to drain water induced into the blower 100 through the outside air intake 112 to the condensed water outlet 164 when the vehicle travels on the road in the rain, travels on the waterway or is washed. The drain means 190 includes a drain pipe 192 for communicating the lower end of the intake duct 110 and the lower end of the air conditioning case 160, and a drain passage 194 for communicating the drain pipe 192 and the condensed water outlet 164 on the lower end of the air conditioning case 160.

The drain pipe 192 may be formed integrally with the intake duct 110 and connected to the air conditioning case 160, or formed integrally with the air conditioning case 162 and connected to the intake duct 110.

Figure 3:
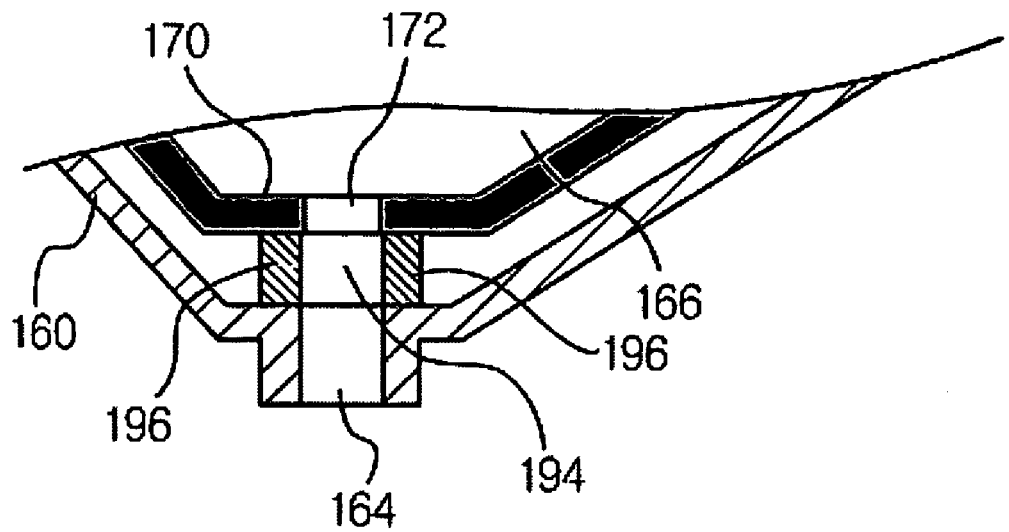
FIG. 3 is a partially sectional view taken along the lime of III-III of FIG. 2, showing an example of a drain passage of the two layer type air conditioner according to the present invention.

Moreover, as shown in FIG. 3, the drain passage 194 may be formed by a pair of ribs 196 extending from the drain pipe 192 to the condensed water outlet 164 on the bottom or at the lower portion of the air conditioning case 160. That is, a space formed between the ribs 196 serves as the drain passage 194 by being covered by the insulator 170. Furthermore, the ribs 196 can be molded integrally with the insulator 170.

Figure 4:
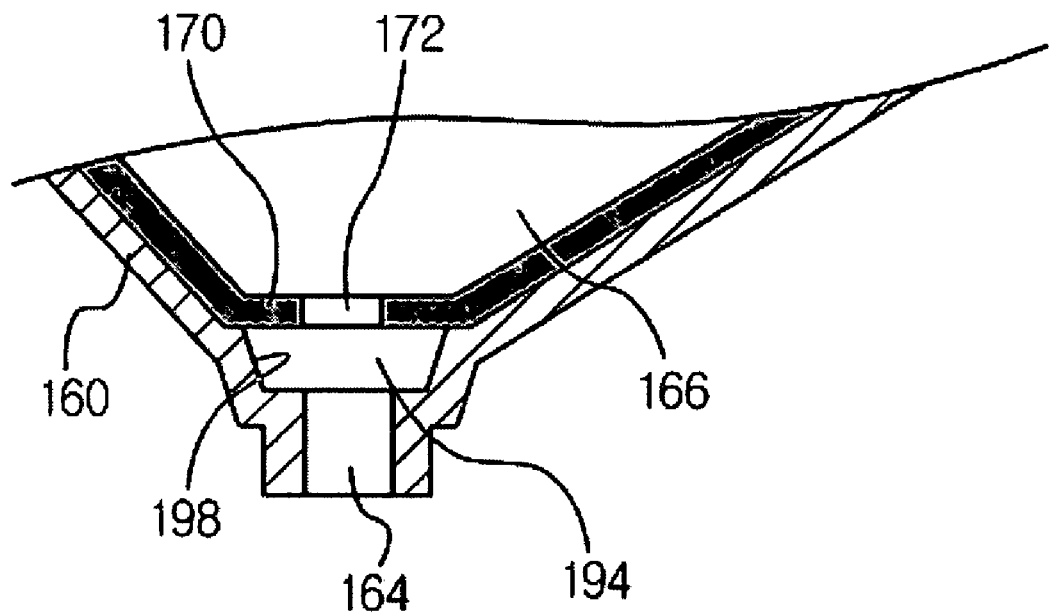
FIG. 4 is a partially sectional view taken along the lime of III-III of FIG. 2, showing another example of the drain passage of the two layer type air conditioner according to the present invention.

In substitute for the drain passage 194, as shown in FIG. 4, a recess 198 extending from the drain pipe 192 to the condensed water outlet 164 may be formed on the bottom of the air conditioning case 160. The recess 198 may have a trench structure. Therefore, the recess 198 can serve as the drain passage 194 by being covered with the insulator 170.

Figure 5:
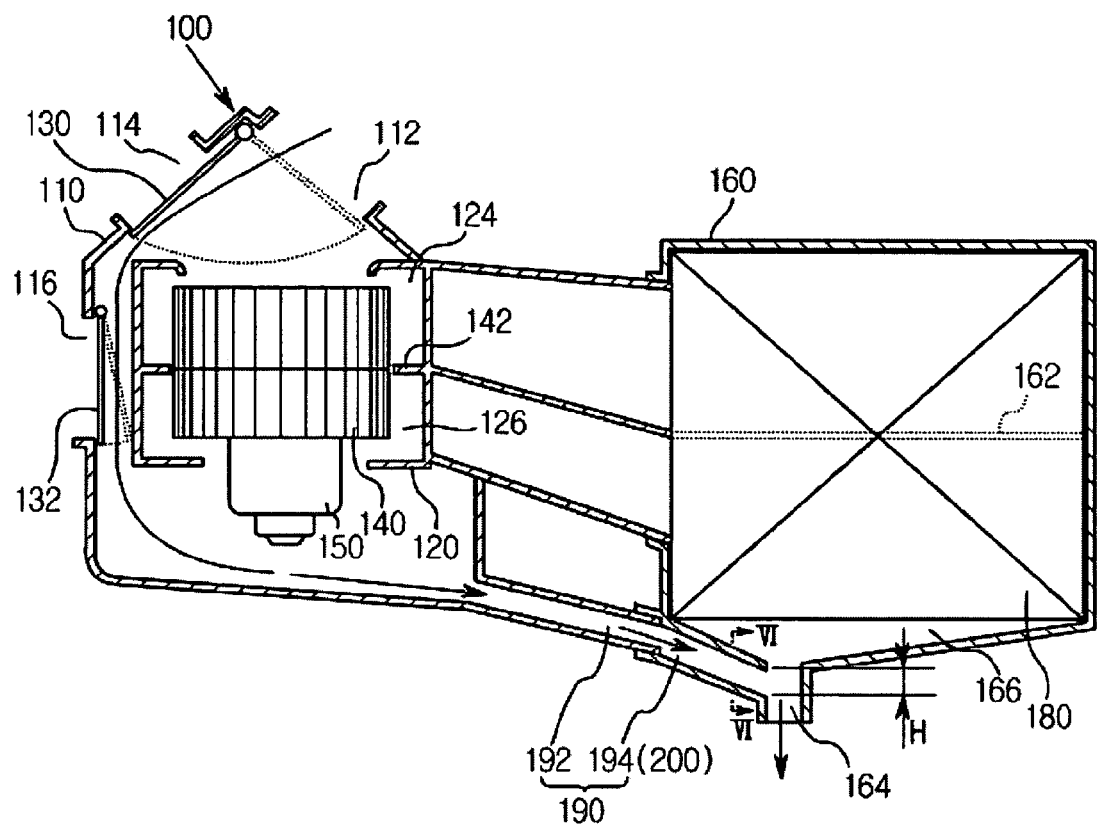
FIG. 5 is a sectional view of a two layer type air conditioner according to a second preferred embodiment of the present invention.
Figure 6:
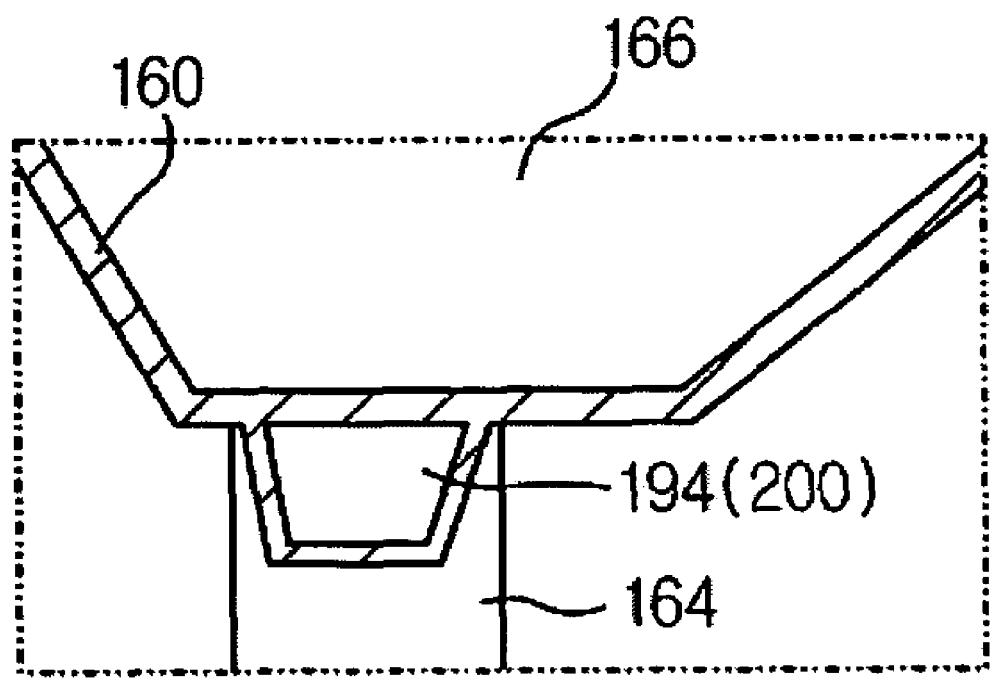
FIG. 6 is a sectional view taken along the line of VI-VI of FIG. 5.

Meanwhile, FIGS. 5 and 6 show a two layer type air conditioner of vehicles according to another preferred embodiment of the present invention. In this embodiment, the drain means 190 having the same function as the drain passage 194 without the insulator 170 is adopted.

That is, in this embodiment, the drain passage 194 may be formed by a drain guide pipe 200 formed integrally with the lower surface of the air conditioning case 160. The drain guide pipe 200 has a trench structure, and has an inlet connected to the drain pipe 192 and an outlet connected integrally with the condensed water outlet 164, thereby inducing drainage of water induced into the blower to the condensed water outlet 164.

As shown in FIG. 5, it is preferable that an outlet of the drain passage 194 described above is located lower to a predetermine height (H) than a drainage space 166 formed beneath the evaporator 180 and connected to the condensed water outlet 164. Moreover, it is preferable that the drain pipe 192 is downwardly inclined from the blower 100 to the drain passage 194.

Additionally, it is preferable that the drain passage 194 directly communicates the drain pipe 192 with the condensed water outlet 164 in a state where it is intercepted from passages of the air conditioning case 160 in which the air flows.

Next, the function of the two layer type air conditioner of vehicles according to the present invention will be described.

When the air conditioner is operated in a heating mode by the inside air intake mode, the first door 130 closes the outside air intake 112 and opens the first inside air intake 114, and the second door 132 opens the second inside air intake 116. Therefore, the inside air sucked through the first and second inside air intakes 114 and 116 is blown to the air conditioning case 160 through the first and second passages 124 and 126 of the scroll case 120, and thermally exchanged by the evaporator 180. After that, the inside air is discharged to the inside of the vehicle through the opened vent. Of course, in the heating mode, the air passes through the heater core, and it is the same also in the air intake mode which will be described later.

When the air conditioner is operated in a cooling mode by the outside air intake mode, the first door 130 opens the outside air intake 112 and closes the first inside air intake 114, and the second door 132 closes the second inside air intake 116. Therefore, the outside air sucked through the outside air intake 112 is blown to the air conditioning case 160 through the first and second passages 124 and 126 of the scroll case 120, and thermally exchanged by the evaporator 180. After that, the inside air is discharged to the inside of the vehicle through the opened vent.

When the air conditioner is operated in the cooling mode by the inside/outside air intake mode, the first door 130 opens the outside air intake 112 and closes the first inside air intake 114, and the second door 132 opens the second inside air intake 116. Therefore, the outside air sucked through the outside air intake 112 is blown to the air conditioning case 160 through the first flow channel 124, thermally exchanged by the evaporator 180, and then, discharged toward a window and/or a passenger's face through a defrost vent and/or a face vent. Moreover, the inside air sucked through the second inside air intake 116 is blown to the air conditioning case 160 through the second flow channel 126 of the scroll case 120, thermally exchanged by the evaporator 180, and then, discharged toward the passenger's feet.

Meanwhile, in the air intake mode, the air conditioner is operated in the outside air intake mode or the inside/outside air intake mode, water may be induced into the blower 100 through the outside air intake 112 when the vehicle travels on the road in the rain, travels on the waterway or is washed. The water induced into the blower 100 can be naturally drained to the condensed water outlet 164 formed in the air conditioning case 160 through the drain pipe 192 and the drain passage 194 along the bottom of the intake duct 110 without backflow.

Furthermore, when the air conditioner is operated in the cooling mode, the condensed water is generated on the surface of the evaporator 180, and flows toward the drainage space 166 formed beneath the evaporator 180. The condensed water flowing toward the drainage space 166 is drained to the condensed water outlet 164 through the drain hole 172 if the insulator 170 is mounted as shown in FIG. 2, but directly drained to the condensed water outlet 164 if the insulator 170 is not mounted as shown in FIG. 5. During the drainage process of the condensed water, since the drain passage 194 is located lower than the drainage space 166 and intercepted from the drainage space 166 by the insulator 170 or the bottom of the air conditioning case 160, it can be prevented that the condensed water, the water drained from the blower 100 to the condensed water outlet 164 and the air blown from the blower 100 to the air conditioning case 160 flows backwardly to the blower 100. That is, since the air flowing path and the water drainage path intercept each other, the backward flow of water or air from the air conditioning case 160 to the blower 100 is prevented.

Moreover, in the two layer type air conditioner of vehicles according to the present invention, since the space formed between the insulator 170 and the air conditioning case 160 serves as the drain passage 194, the water induced into the blower 100 can be smoothly drained without having any influence on the entire volume of the air conditioning case 160. In addition, in case where there is no the insulator 170, the drain guide pipe 200 is formed integrally with the lower surface of the air conditioning case 160, whereby the drain guide pipe 200 can serve the same drainage function as the above.

As described above, the illustrated two layer type air conditioner of vehicles can prevent backflow of water or air to the blower 100 since the drain passage 194 is intercepted from the drainage space 166 formed beneath the lower portion of the evaporator 180 and is not influenced by a static pressure difference between the evaporator 180 and the bottom of the intake duct 110.

Moreover, the two layer type air conditioner can smoothly drain water from the blower 100 to the condensed water outlet 164 even though the size of the drain passage 194 is small since the drain passage 194 is intercepted from the air flowing path and never stopped by foreign matters.

Furthermore, it is not necessary to seal around the blower 100 to prevent backflow of water to the blower 100 since water does not flow backwardly to the blower 100 and the drain passage 194 is never stopped.

Additionally, in case where the drain passage 194 is formed by the drain guide pipe 200, even though there is no insulator 170, water can be drained from the blower 100 to the condensed water outlet 164 by the drain passage 194.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A two layer type air conditioner for vehicle comprising:
a blower having an intake duct arrangement for inhaling the inside air and outside air, a double suction type scroll case mounted on the intake duct arrangement and divided into two passages by a partition plate, a blower fan rotatably mounted in the two passages, and a motor for rotating the blower fan;

an air conditioning case housing an evaporator therein for cooling the air blown from the blower and a condensed water drain hole for draining condensed water generated from the evaporator, the air conditioning case being divided into two passages corresponding to the scroll case;

a drain arrangement for draining water induced into the blower to a water outlet of the air conditioner, the drain arrangement including:

(a) a drain pipe for communicating the lower end of the intake duct with the lower end of the air conditioning case; and (b) a drain passage having an inlet at the end of the drain pipe and an outlet below its inlet; the drain passage outlet being above the water outlet of the air conditioner and connected in gravity liquid flow relation to the water outlet, the drain passage directly communicating the drain pipe with the water outlet in a way so water flowing in the drain passage is isolated from passages of the air conditioning case in which the air flows so that water flowing in the drain passage is prevented from flowing into the air conditioning case, the drain passage outlet being located below, by a predetermined amount, the drain hole and a drainage space formed beneath the evaporator at the lower end of the air conditioning case.

2. The two layer type air conditioner according to claim 1, wherein the drain passage includes a space surrounded by a pair of ribs mounted on the bottom of the air conditioning case, and the bottom of the air conditioning case; a thermal insulator mounted (a) beneath the evaporator and (b) between (i) the drain passage and (ii) the drainage space, including the drain hole, in the air conditioning case beneath the evaporator.

3. The two layer type air conditioner according to claim 1, wherein the drain passage includes a space surrounded by a recess formed on the bottom of the air conditioning case; a thermal insulator mounted (a) beneath the evaporator and (b) between (i) the drain passage and (ii) the drainage space, including the drain hole, in the air conditioning case beneath the evaporator.

4. The two layer type air conditioner according to claim 1, wherein the drain passage includes a drain guide pipe that is integral with the lower surface of the air conditioning case.

5. A two layer type air-conditioner for a vehicle comprising:

a scroll case, an air conditioning case, and a water outlet;

the scroll case including: (a) a blower region having (i) an air inlet arrangement and (ii) a blower fan for sucking air through the air inlet arrangement from outside the scroll case and for blowing air in the scroll case to the interior of the air conditioning case via a first passage arrangement between the blower region and the interior of the air-conditioner case, and (b) a second passage arrangement in liquid gravity flow relation from the blower region to a drain passage leading to, and in, liquid gravity flow relation with the outlet, the second passage being below the first passage;

the air conditioning case including: (a) an evaporator in fluid flow relation with the first passage arrangement; the interior of the air conditioning case being arranged so it is not in liquid flow relation with either the second passage arrangement or the drain passage; the evaporator being arranged so that condensed water is on the exterior thereof during operation of the air-conditioner, and (b) a floor below the evaporator for receiving, by gravity, water condensed by the evaporator; the lowest most portion of the floor having a drain hole for the water received on the floor; the drain hole and the water outlet being positioned so that there is a liquid gravity flow passage between them for the water received on the floor of the air conditioning case and flowing through the drain hole;

the drainage passage having an outlet below the drain hole so that water flowing from the blower region through the second passage arrangement flows, by gravity, (i) to the drainage passage outlet without flowing into the drain hole and (ii) from the drainage passage outlet to the water outlet;

wherein all directions and operations set forth in this claim and any claim dependent thereon are while the air-conditioner is installed and in operation in the vehicle.

6. The air-conditioner of claim 5 further including a thermal insulator extending horizontally between a wall of the drain passage and a space in the air conditioning case below the bottom of the evaporator and the floor below the evaporator, the thermal insulator extending vertically between the drain hole in the bottom of the evaporator.

7. The air-conditioner of claim 5 wherein the drain passage is between the cases.

8. The air-conditioner of claim 5 wherein the drain passage includes an interior upper wall surface on a lower surface of structure having an upper surface mention them with a portion of the floor of the air conditioning case.

* * * * *